(12) United States Patent
Gutowski et al.

(10) Patent No.: US 11,571,947 B2
(45) Date of Patent: Feb. 7, 2023

(54) VEHICLE AIR CONTROL SYSTEM

(71) Applicant: Ford Global Technologies, LLC, Dearborn, MI (US)

(72) Inventors: Alan Gutowski, Wixom, MI (US); David Alan Wong, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 530 days.

(21) Appl. No.: 16/683,449

(22) Filed: Nov. 14, 2019

(65) Prior Publication Data
US 2021/0146744 A1    May 20, 2021

(51) Int. Cl.
*B60H 1/00* (2006.01)
*B60H 3/06* (2006.01)

(52) U.S. Cl.
CPC ......... *B60H 1/008* (2013.01); *B60H 1/00764* (2013.01); *B60H 1/00835* (2013.01); *B60H 3/06* (2013.01)

(58) Field of Classification Search
USPC .................................................. 454/69–165
See application file for complete search history.

(56) References Cited

U.S. PATENT DOCUMENTS

| | | | | |
|---|---|---|---|---|
| 10,190,957 | B2 * | 1/2019 | Hoke | B60H 1/00764 |
| 10,232,296 | B2 * | 3/2019 | Takaoka | B01D 46/0086 |
| 2012/0009859 | A1 | 1/2012 | Wijaya et al. | |
| 2013/0332013 | A1 * | 12/2013 | Malone | B60K 6/48 701/22 |
| 2017/0106715 | A1 * | 4/2017 | Duan | B60H 1/24 |
| 2017/0113517 | A1 * | 4/2017 | Kwon | B01D 46/429 |
| 2017/0328259 | A1 * | 11/2017 | Uchiyama | F01N 3/18 |
| 2018/0134112 | A1 * | 5/2018 | Seiferlein | B60H 1/008 |
| 2018/0288932 | A1 * | 10/2018 | Winkel | B60H 1/00378 |
| 2019/0039435 | A1 * | 2/2019 | Hasan | B60H 1/00764 |
| 2019/0152298 | A1 * | 5/2019 | Kurata | B60H 1/32 |
| 2020/0039321 | A1 * | 2/2020 | Sakai | G05D 1/021 |
| 2020/0070627 | A1 * | 3/2020 | Sakai | B60H 1/00764 |
| 2020/0148216 | A1 * | 5/2020 | Garcia Ramirez | B60R 16/0236 |

(Continued)

FOREIGN PATENT DOCUMENTS

| | | | | |
|---|---|---|---|---|
| CN | 104566663 | A | 4/2015 | |
| CN | 106114133 | A * | 11/2016 | B60H 1/008 |

(Continued)

*Primary Examiner* — Ko-Wei Lin
(74) *Attorney, Agent, or Firm* — Vichit Chea; Price Heneveld LLP

(57) ABSTRACT

A vehicle air control system includes a vehicle body that defines an interior. A first particulate matter sensor is coupled to an exterior of the vehicle body. A second particulate matter sensor is disposed within the interior of the vehicle body. A temperature sensor is coupled to the exterior of the vehicle body. A vehicle speed sensor is coupled to the vehicle body. A heat, ventilation, and air condition (HVAC) system is disposed within the interior of the vehicle body. The HVAC system includes an inlet door rotatable between a first position, a second position, and a third position therebetween. A controller is configured to receive a signal from at least one of the first and second particulate matter sensors, the temperature sensors, and the vehicle speed sensor. The controller is configured to rotate the inlet door in response to the signal.

19 Claims, 9 Drawing Sheets

(56) References Cited

U.S. PATENT DOCUMENTS

2020/0223288 A1\* 7/2020 Srivastava ......... B60H 1/00764
2021/0316593 A1\* 10/2021 Ishizeki ............. B60H 1/00764

FOREIGN PATENT DOCUMENTS

| CN | 106314078 A | \* | 1/2017 |
| CN | 107796671 A | | 3/2018 |
| KR | 100620060 B1 | | 8/2006 |

\* cited by examiner

FIG. 8

Table 118:

| Sensed Vehicle Speed (km/hr) | Sensed External PM Above First Threshold | |
|---|---|---|
| | Sensed External Temperature (°C) | |
| | First Temperature | Second Temperature |
| First Speed | Third Position | First Position |
| Second Speed | First Position | First Position |

FIG. 9

Table 118:

| Sensed Vehicle Speed (km/hr) | Sensed External PM Below Second Threshold | |
|---|---|---|
| | Position Of Inlet Door When Sensed External PM Above First Threshold | |
| | Third Position | First Position |
| First Speed | Second Position | Third Position |
| Second Speed | Second Position | Second Position |

VEHICLE AIR CONTROL SYSTEM

FIELD OF THE DISCLOSURE

The present disclosure generally relates to an air control system. More specifically, the present disclosure relates to an air control system for a vehicle.

BACKGROUND OF THE DISCLOSURE

Vehicles include heating, ventilation, and air conditioning (HVAC) systems for regulating airflow within the vehicle. The HVAC system is typically configured to selectively recirculate air within the vehicle and selectively allows outside air to flow into the vehicle. The regulation of the recirculation and outside air is typically accomplished by positioning a recirculation door of the HVAC system in a selected position.

SUMMARY OF THE DISCLOSURE

According to at least one aspect of the present disclosure, a vehicle air control system includes a vehicle body that defines an interior. A particulate matter sensor coupled to the vehicle body. A temperature sensor is coupled to the exterior of the vehicle body. A vehicle speed sensor is coupled to the vehicle body. A heat, ventilation, and air condition (HVAC) system is disposed within the interior of the vehicle body. The HVAC system includes an inlet door rotatable between a first position, a second position, and a third position therebetween. A controller is configured to receive a signal from at least one of the first and second particulate matter sensors, the temperature sensors, and the vehicle speed sensor. The controller is configured to rotate the inlet door in response to the signal.

According to another aspect of the present disclosure, an air control system for a vehicle includes a vehicle body that defines an interior. At least one vehicle window is coupled to the vehicle body. A heat, ventilation, and air conditioning (HVAC) system is disposed within the interior. The HVAC system includes an inlet door that is operable between a first position, a second position, and a third position therebetween. A particulate matter sensor is disposed in the interior of the vehicle body. A window sensor assembly is coupled to the vehicle body and is configured to sense a position of the at least one vehicle window. A controller is configured to control the inlet door in response to a signal from at least one of the particulate matter sensor and the window sensor assembly.

According to another aspect of the present disclosure, a method of controlling air quality of a vehicle interior includes starting a recirculation strategy in a vehicle. Particulate matter is sensed exterior to the vehicle and a vehicle speed is sensed. An ambient air temperature sensed exterior to the vehicle. An air inlet door of an HVAC system is positioned in a first position when the sensed particulate matter is above a first predetermined particulate matter threshold. The first position is selected based on the sensed vehicle speed and the sensed ambient air temperature. The air inlet door is positioned in a second position when the sensed particulate matter is below a second predetermined particulate matter threshold.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 8 is a table illustrating a position of an HVAC system inlet door as a function of temperature and vehicle speed of a second recirculation strategy of the air control system of FIG. 4;

FIG. 9 is a table illustrating a position of an HVAC system inlet door as a function of previous position of FIG. 8 and vehicle speed of the second recirculation strategy of the air control system.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
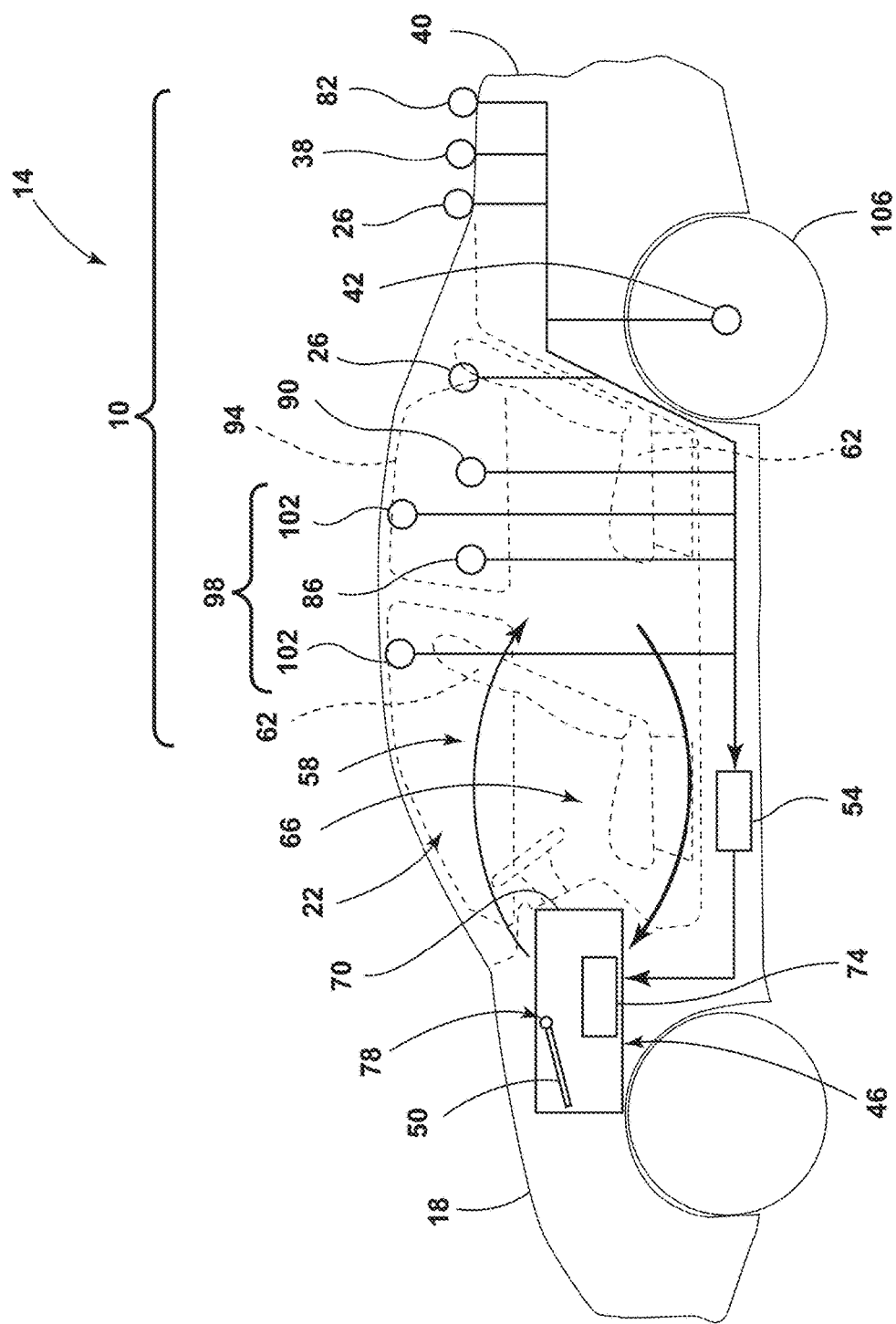
FIG. 1 is a schematic view of an air control system for a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-9, reference numeral 10 generally refers to an air control system for a vehicle 14 including a vehicle body 18 that defines an interior 22. A particulate matter (PM) sensor 26 is coupled to the vehicle body 18. A first temperature sensor 38 is coupled to an exterior 40 of the vehicle body 18. A vehicle speed sensor 42 is coupled to the vehicle body 18. A heat, ventilation, and air conditioning (HVAC) system 46 is disposed within the interior 22 of the vehicle body 18. The HVAC system 46 includes an inlet door 50 rotatable between a first position, a second position, and a third position therebetween. A controller 54 is configured to receive a signal from at least one of the PM sensor 26, the first temperature sensor 38, and the vehicle speed sensor 42. The controller 54 is configured to rotate the inlet door 50 in response to the signal.

Referring to FIG. 1, the interior 22 of the vehicle 14 includes a passenger cabin 58 that has multiple seating assemblies 62 arranged in one or more seating rows 66. Each of the seating rows 66 may include one or more of the seating assemblies 62. The vehicle 14 may be a sedan, a sport utility vehicle, a van, a truck, a crossover, or another style of vehicle 14. In various examples, the vehicle 14 may be a manually operated vehicle 14 (e.g., with a human driver), a fully autonomous vehicle 14 (e.g., with no human driver), or a partially autonomous vehicle 14 (e.g., operated with or without a human driver). Additionally, the vehicle 14 may be utilized for personal and/or commercial purposes, such as for ride-providing services (e.g., chauffeuring) and/or ride-sharing services.

The vehicle 14 includes the HVAC system 46 generally disposed in a vehicle-forward portion of the interior 22 of the vehicle 14. In various examples, the HVAC system 46 may be configured as a split HVAC system 46 disposed partially within the interior 22 of the vehicle body 18. The HVAC system 46 typically provides conditioned air into the passenger cabin 58. The HVAC system 46 can clean, cool, heat, regulate, ventilate, and/or dehumidify the air that is directed into the passenger cabin 58. In various examples, the HVAC system 46 is disposed adjacent to a B-surface of an instrument panel 70. As used herein, the term "B-surface" refers to a surface of any component within the vehicle 14 that is concealed and/or non-contactable by an occupant of the vehicle 14 when the component is in an assembled state. The HVAC system 46 includes the inlet door 50 that is rotatable between the first and second positions. According to various aspects, the first position of the inlet door 50 may be a recirculation, or closed, position that recirculates air within the interior 22 and can substantially prevent outside air from entering the vehicle 14 through the HVAC system 46. The second position of the inlet door 50 may be an outside air, or fully opened, position that allows outside air to flow through the HVAC system 46 to the interior 22. The third position, between the first and second positions, may be a partial recirculation, or partially opened, position that allows some outside air to enter the interior 22 through the HVAC system 46. The third position can be any position between the first and second positions. Moreover, the inlet door 50 can be rotated to additional positions without departing from the teachings herein. Stated differently, when the inlet door 50 is in the first position, the HVAC system 46 can recirculate air within the interior 22 of the vehicle 14. When the inlet door 50 is in the second position, outside air may enter the HVAC system 46, flow through a filter 74, and flow into the interior 22 of the vehicle 14. The third position of the inlet door 50 may provide for outside air to enter the HVAC system 46; however, the amount of outside air is a less than the amount of outside air that enters the HVAC system 46 when the inlet door 50 is in the second position. While the inlet door 50 is in the third position, the HVAC system 46 may at least partially recirculate the air within the interior 22 of vehicle 14.

Referring still to FIG. 1, the vehicle 14 includes the air control system 10. The air control system 10 includes the controller 54, which is in communication with various sensors associated with the vehicle 14. The various sensors can send a signal to the controller 54, and the controller 54 can send a corresponding signal to a rotation assembly 78 to rotate the inlet door 50 to a selected position (e.g., the first, second, or third position). According to various aspects, some of the sensors that are in communication with the controller 54 may be coupled to the exterior 40 of the vehicle body 18. The external sensors are configured to sense information that is external to the vehicle 14. In various examples, the air control system 10 includes the first temperature sensor 38 coupled to the exterior 40 or otherwise, disposed external to the vehicle 14. The first temperature sensor 38 may be configured to sense exterior ambient temperatures of the outside air proximate to the vehicle 14.

The sensed exterior temperature may be communicated to the controller 54 by the first temperature sensor 38.

Additionally or alternatively, the air quality sensor 82 may be coupled to the exterior 40 or otherwise disposed external to the vehicle 14. The air quality sensors 82 may be configured to sense pollutants in the outside air to the vehicle 14. The sensed pollutants can include, oxidizable or reducible gases, such as, for example, carbon monoxide, hydrocarbons, and other partially burned fuel components. The air quality sensor 82 may send a corresponding signal of the sensed pollutants to the controller 54. According to various non-limiting aspects, the signal from the air quality sensor 82 may be configured as a filtered pulse width modulation (PWM) signal with six different discrete levels. In a non-limiting example, the different discrete levels of the filtered PWM signal may include levels in the order of, for example, zero to five, where zero is the minimum PWM level from the air quality sensor 82 and five is the maximum PWM level from the air quality sensor 82. In such non-limiting examples, level six of the filtered PWM signal may be a transitory level to aid in calibration and sensor readiness detection.

Additionally or alternatively, the air control system 10 may include various sensors that are disposed within the interior 22 of the vehicle body 18. In a non-limiting example, the PM sensor 26 may be disposed within the interior 22. The PM sensor 26 may sense internal PM of the air within the interior 22 of the vehicle 14 and/or may send external PM. In various examples, when the inlet door 50 is in the first position, the PM sensor 26 can sense PM within the interior 22 of the vehicle 14. When the inlet door 50 is in the second position, the PM sensor 26 can sense PM of the outside air proximate to the vehicle 14. Additionally or alternatively, then the inlet door 50 is in the third position, the PM sensor 26 can sense PM both in the interior 22 and external to the vehicle 14. The sensed PM can be communicated from the PM sensor 26 to the controller 54. It is contemplated that the vehicle 14 may include the PM sensor 26 disposed in the interior 22 and an additional PM sensor 26 coupled to the exterior 40 of the vehicle 14.

Additionally or alternatively still, the air control system 10 may include a second temperature sensor 86 configured to sense an internal temperature of the air within the interior 22 of the vehicle 14. The sensed internal temperature may be communicated to the controller 54. According to various aspects, the air control system 10 may include a humidity sensor 90 disposed within the interior 22 of the vehicle 14. The humidity sensor 90 may be configured to sense moisture within the interior 22 of the vehicle 14 and send a corresponding signal of the sensed humidity to the controller 54. In various examples, the humidity sensor 90 may additionally sense the internal temperature of the vehicle 14. In such examples, the humidity sensor 90 may include the second temperature sensor 86, such that there is a single sensor that senses the internal temperature and the humidity within the interior 22 of the vehicle 14.

As illustrated in FIG. 1, the vehicle 14 includes a plurality of windows 94. Each of the plurality of windows 94 is operable between an opened position, a partially opened position, and a closed position. According to various aspects, the air control system 10 may include a window sensor assembly 98 that includes a plurality of window sensors 102 each configured to sense a position of at least one of the plurality of windows 94. In various examples, one of the plurality of window sensors 102 may be disposed proximate each of the plurality of windows 94. In such examples, the window sensor assembly 98 may sense when one, multiple, or all of the plurality of windows 94 are in the opened position, the partially opened position, or the closed position. The window sensor assembly 98 may send a signal to the controller 54 corresponding to the sensed window position of each of the plurality of windows 94.

In various examples, the air control system 10 may include the vehicle speed sensor 42. The vehicle speed sensor 42 may be disposed in the interior 22 of the vehicle body 18, or alternatively, may be disposed external to the vehicle body 18. In a non-limiting example, the vehicle speed sensor 42 can measure a transmission/transaxle output. The vehicle speed sensor 42 may be a component of an engine, a braking system, or included in another system of the vehicle 14. Additionally or alternatively, the vehicle speed sensor 42 may be coupled to a wheel 106 of the vehicle 14. In another non-limiting example, the vehicle speed sensor 42 can measure a wheel speed (e.g., revolutions per minute). The vehicle speed sensor 42 may send a signal to the controller 54 corresponding to a sensed vehicle speed.

Figure 2:
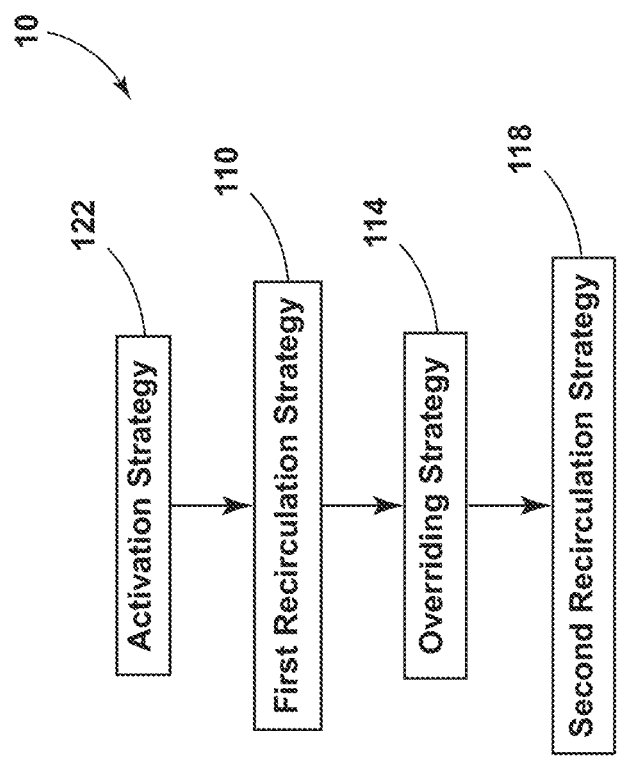
FIG. 2 is a flow diagram of various strategies to regulate airflow of the air control system, according to one example.

Referring to FIGS. 1 and 2, the air control system 10 may be configured to regulate outside airflow and recirculation of air through a first recirculation strategy 110, an overriding strategy 114, and a second recirculation strategy 118 after assessing various conditions relating to the vehicle 14 through an activation strategy 122. In each of the first and second recirculation strategies 110, 118 and the overriding strategy 114, the controller 54 sends a signal to the rotation assembly 78 to control the position of the inlet door 50 of the HVAC system 46 in response to one or more signals from the sensors of the air control system 10. Prior to the first recirculation strategy 110, the controller 54 may conduct an activation strategy 122 to determine if the various conditions are satisfied to implement one or more of the first and second recirculation strategy 110, 118 and the overriding strategy 114.

Figure 3:
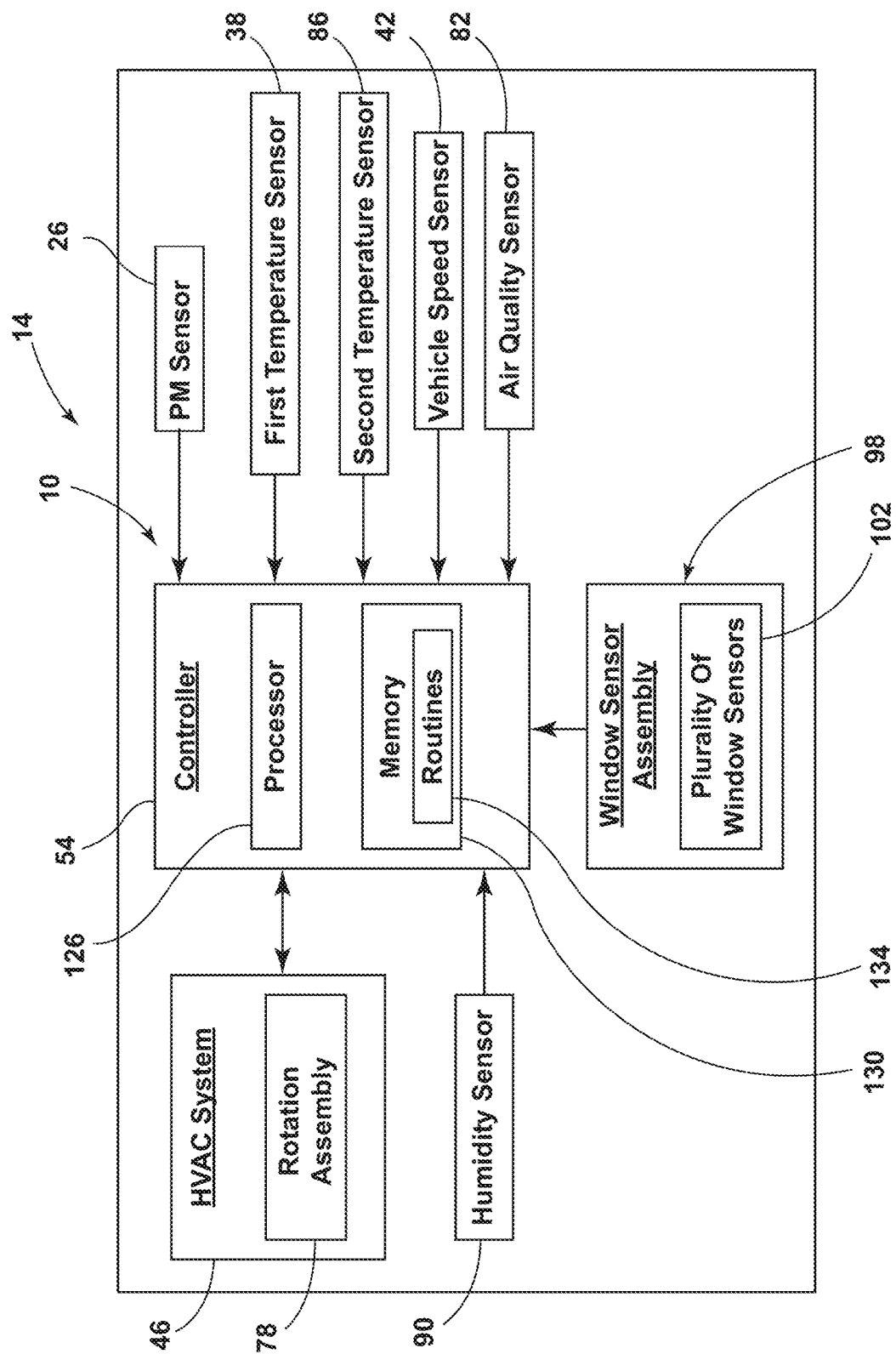
FIG. 3 is a block diagram of a vehicle having an air control system, according to one example.
Figure 5:
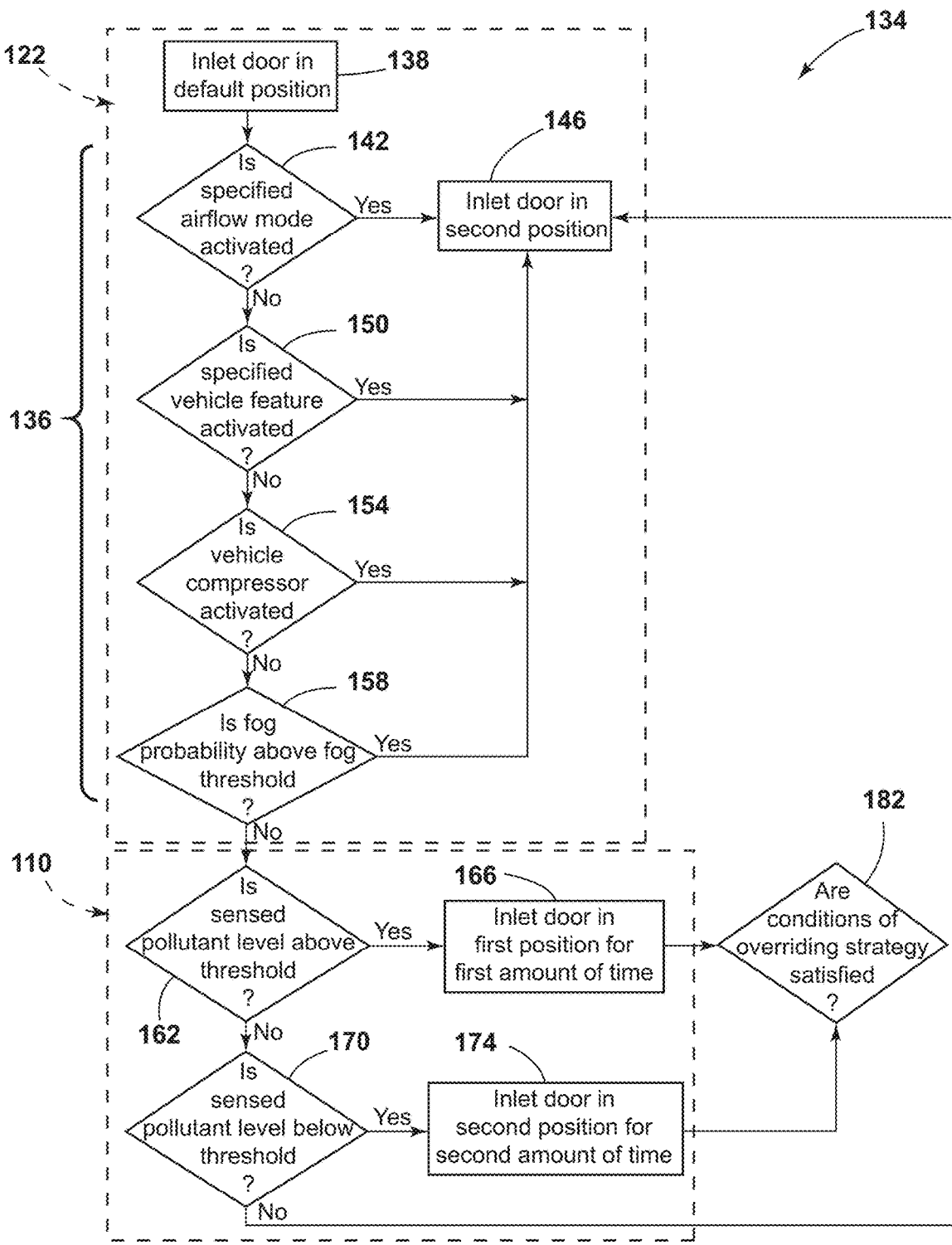
FIG. 5 is a flow diagram of an activation strategy and a first recirculation strategy of a vehicle air control system, according to one example.

Referring to FIGS. 1, 3, and 5, according to various aspects, the controller 54 includes a processor 126, a memory 130, and other control circuitry. Instructions or routines 134 are stored in the memory 130 and executable by the processor 126. The controller 54 may include one or more routines 134 relating to the activation strategy 122. In step 136, the controller 54 may determine whether various predefined vehicle conditions are satisfied, such that the routine 134 may proceed to the first recirculation strategy 110. In step 138, the inlet door 50 is disposed in a default position. In a non-limiting example, the default position may be the second position (e.g., the outside air position). Through the activation strategy 122, the controller 54 can determine whether the inlet door 50 should remain in the second position, or if the first recirculation strategy 110 should be initiated. In this way, certain conditions of the vehicle 14 can prevent the first and second recirculation strategies 110, 118 from being conducted (e.g., deactivating conditions).

Figure 4:
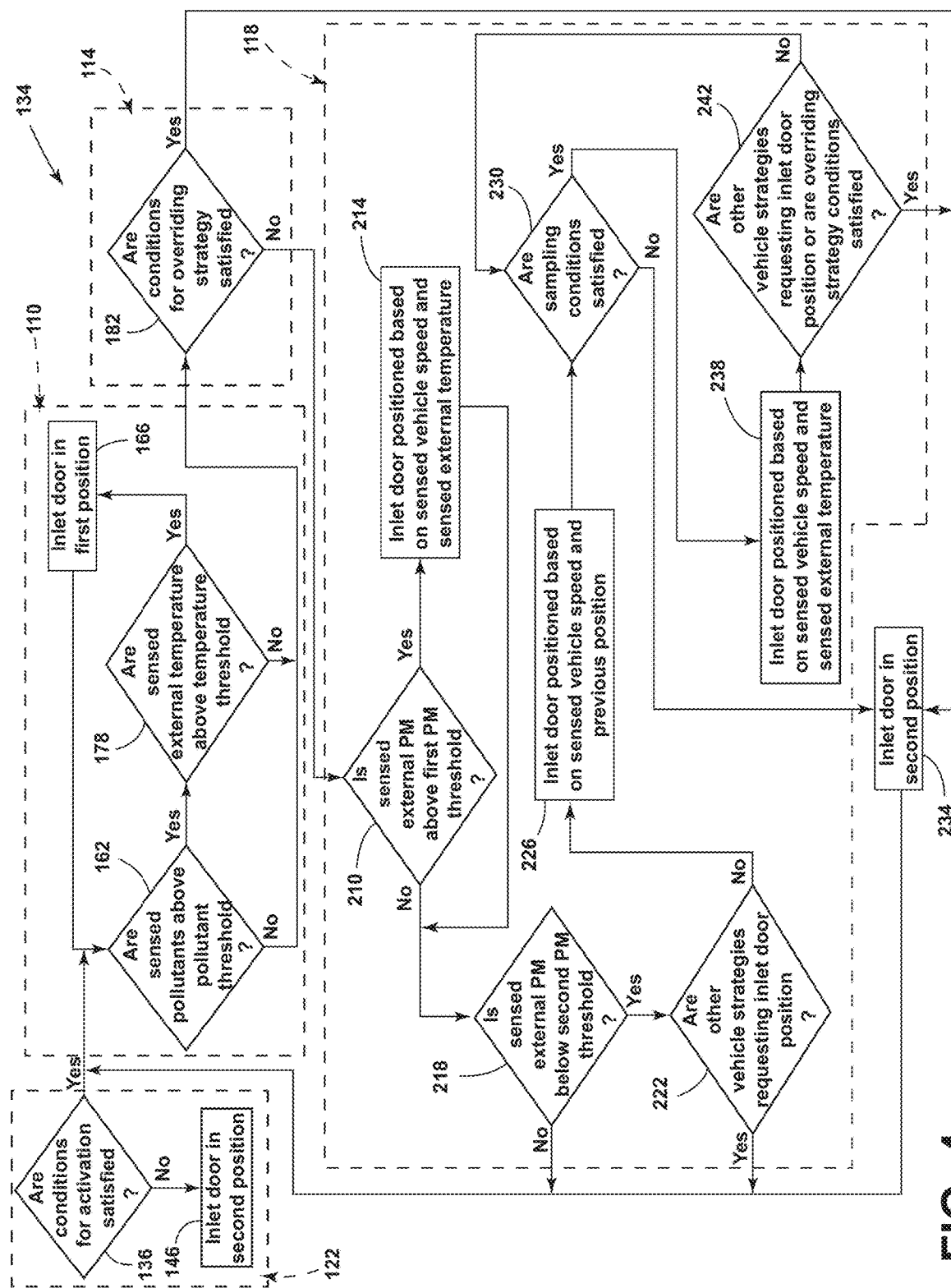
FIG. 4 is a flow diagram of an air control system for a vehicle, according to one example.

Referring to FIGS. 1, 4, and 5 in decision step 142, the controller 54 may determine whether a predefined airflow mode is activated within the vehicle 14. In a non-limiting example, the predefined airflow mode may be a defrost, or max defrost, setting. It is contemplated that the predefined airflow mode can be any airflow setting of the vehicle 14. If the predefined airflow mode is activated, the routine 134 can proceed to step 146 where the inlet door 50 remains in the second position. According to various aspects, step 146 may coincide with the default position of the inlet door 50. If the predefined airflow mode is not activated, the routine 134 may proceed to decision step 150. In decision step 150, the controller 54 may determine whether a predefined vehicle feature is activated. In a non-limiting example, the predefined vehicle feature may be a heated windshield. In another non-limiting example, the predefined vehicle feature may be a heated backlight. If the controller 54 determines that the predefined vehicle feature is activated, the routine 134 can proceed to step 146 where the inlet door 50 remains in the second position.

If the controller 54 determines that the predefined vehicle feature is not activated, the routine 134 may proceed to decision step 154. In decision step 154, the controller 54 can determine if a compressor of the HVAC system 46 is activated. Stated differently, in decision step 154, the controller 54 determines whether an air-conditioning function is activated within the vehicle 14. If the compressor, and therefore the air conditioning, is activated, the routine 134 may proceeds to step 146 where the inlet door 50 remains in the second position. If the controller 54 determines that the compressor is not activated, then the routine 134 may proceed to decision step 158.

In decision step 158, the controller 54 can determine whether a fog probability is higher than a predetermined fog threshold. In a non-limiting example, the fog probability may be expressed as a percentage, where 0% is a low probability of fogging and 100% is a high probability of fogging. The fog probability can be determined based on the sensed information from the humidity sensor 90 and the first and second temperature sensors 38, 86. According to various aspects, the controller 54 can include one or more routines 134 for determining the fog probability based on the sensed internal and external temperatures and the sensed humidity. In a non-limiting example where the humidity sensor 90 is coupled to the instrument panel 70, the predetermined fog threshold may be in a range of from about 15% to about 20%. In such examples, if the controller 54 determines that the fog probability is greater than the range of from about 15% to about 20%, the routine 134 can proceed to step 146 with the inlet door 50 remaining in the second position. In an additional or alternative non-limiting example where the humidity sensor 90 is disposed elsewhere in the interior 22 (e.g., not coupled to the instrument panel 70), the predetermined fog threshold may be in a range of from about 25% to about 35%. In such examples, if the controller 54 determines that the fog probability is greater than the range of from about 25% to about 35%, the routine 134 may proceed to step 146.

If the controller 54 determines that the fog probability is less than the predetermined fog threshold, the routine 134 may proceed to the first recirculation strategy 110. It is contemplated that any of decision steps 142, 150, 154, 158 of the activation strategy 122 may be accomplished in any practicable order. Moreover, the deactivating conditions (e.g., the status of the predefined airflow mode, predefined vehicle feature, compressor, and fog probability) can prevent the activation of subsequent air control strategies. Further, the deactivating conditions can stop the air control strategies at various steps, as discussed in further detail below.

Referring to FIGS. 1, 4, and 5, the controller 54 may include one or more routines 134 for operating the first recirculation strategy 110 of the vehicle 14. In various examples, the first recirculation strategy 110 may operate based on the level of pollutants sensed by the air quality sensor 82 and/or the external temperature sensed by the first temperature sensor 38. In decision step 162, the controller 54 can determine if the sensed pollutant level exceeds a predetermined pollutant level or threshold. The air quality sensor 82 can send the filter PWM signal configured as the discrete level (e.g., zero to five) that indicates the sensed pollutant level to the controller 54. The controller 54 may store a calibratable comparative parameter in the memory 130. The sensed level of pollutants may be compared to the comparative parameter. In this way, the controller 54 may include one or more routines 134 that compares the communicated discrete level of the sensed pollutants to the comparative parameter.

According to various aspects, the air quality sensor 82 may sense the pollutant level and send a corresponding discrete level signal to the controller 54 approximately every 100 ms. Each 100 ms interval can be considered a reading of the pollutant level in the outside air. In a non-limiting example, about three readings of the pollutants by the air quality sensor 82 can be utilized for comparison with the comparative parameter to determine how the routine 134 proceeds. In decision step 162, if the discrete level of pollutants sensed by the air quality sensor 82 is greater than the predetermined pollutant level, the routine 134 may proceed to step 166 of the first recirculation strategy 110. In a non-limiting example, the predetermined pollutant level may be the discrete level two. In such examples, when the sensed pollutant level is the discrete level two for three consecutive readings, the routine 134 may proceed to step 166. In step 166, the inlet door 50 may be rotated to the first position (e.g., the recirculation position) for a predetermined amount of time. In various examples, the predetermined amount of time may be in a range of from about 10 seconds to about 15 seconds. Once the inlet door 50 is in the first position for the predetermined amount of time, the routine 134 may proceed to the overriding strategy 114 and/or the second recirculation strategy 118.

In decision step 170 of the first recirculation strategy 110, the controller 54 can determine if the sensed level of pollutants is less than the predetermined pollutant level for three consecutive readings. The predetermined pollutant level may be the discrete level two if the sensed pollutants is below the predetermined pollutant level, then the routine 134 may proceed to step 174 where the inlet door 50 may be positioned in the second position (e.g., the outside air position) for a predetermined amount of time. In a non-limiting example, the predetermined amount of time may be in a range of from about 45 seconds to about 70 seconds. After the predetermined amount of time, the routine 134 may then proceed to the overriding strategy 114 and/or the second recirculation 118. Alternatively, returning to decision step 170, if the discrete level sensed by the air quality sensor 82 is about equal to the predetermined pollutant level for three consecutive readings, then the routine 134 may proceed to step 146 and the inlet door 50 can remain in the second position.

Figure 6:
FIG. 6 is a table illustrating temperature and time functions of the first recirculation strategy of FIG. 5.

Referring still to FIGS. 1, 5, and 6, the inlet door 50 can be positioned in response to the external temperature sensed by the first temperature sensor 38 during the first recirculation strategy 110. In such examples, the routine 134 may proceed from decision step 162 to decision step 178. In decision step 178, the controller 54 can determine if the sensed external temperature is above a predetermined temperature. In a non-limiting example, the predetermined temperature may be in a range of from about 8° C. to about 12° C. If the sensed external temperature is below the predetermined temperature, the routine 134 may continue to the overriding strategy 114 and/or the second recirculation strategy 118. If the sensed external temperature is above the predetermined temperature, the routine 134 can proceed to step 166 where the inlet door 50 is rotated to the first position.

In various examples, step 166 may include a temporal aspect, beginning when the door 50 is rotated to the first position. In such examples, in step 166, the inlet door 50 may remain in the first position for a first predetermined amount of time. In a non-limiting example, the first predetermined amount of time may be in a range of from about 20 seconds to about 40 seconds. If the first predetermined amount of time has not elapsed the controller 54 determines that the fog probability is above a predetermined fog threshold and the controller 54 may rotate the inlet door 50 from the first position (e.g., the recirculation position) to the second position (e.g., the outside air position). In such examples, the first predetermined amount of time may be reset when the inlet door 50 reaches the second position. Additionally or alternatively, if the first predetermined amount of time elapses and the inlet door 50 remains in the first position, the inlet door 50 may remain in the first position until a predefined condition is satisfied that results in the inlet door 50 returning to the second position. In a non-limiting example, the predefined condition may be a high fog probability determined by the controller 54. In another non-limiting example, the predefined condition may be when the air quality sensor 82 senses pollutants below a predetermined pollutant level as compared to the comparative parameter stored within the controller 54. Additionally or alternatively, any of the deactivating conditions that do not satisfy the activation strategy 122 may likewise result in the inlet door 50 rotating to the second position. The deactivating conditions can include the sensed humidity within the vehicle 14, the status of the predefined airflow mode, the status of the predefined vehicle feature, the status of the compressor and the fog probability. Additionally or alternatively still, the inlet door 50 may remain in the first position until a predetermined external temperature is sensed. In this way, the first recirculation strategy 110 may operate as a function of the sensed external temperature (e.g., ambient air temperature).

The inlet door 50 may remain in the second position for a second predetermined amount of time based on the sensed external temperature. In the non-limiting example, illustrated in FIGS. 1 and 6, when the sensed external temperature is about 0° C., the inlet door 50 may not remain in the first position for more than a minimal amount of time before rotating to the second position. Moreover, when the sensed external temperature is at or above 10° C., the inlet door 50 may remain in the second position for at least about 60 seconds before returning to the first position. In this way, the inlet door 50 may remain in the second position for the second predetermined amount of time based on the sensed external temperature. After the second predetermined amount of time has elapsed, the inlet door 50 may return to the first position based on the pollutant level sensed by the air quality sensor 82. According to various aspects, the inlet door 50 may move at a slower transfer rate between the first and second positions each cycle of the first recirculation strategy 110 when based on the sensed external temperature. In this way, the inlet door 50 may be positioned in the first position and provide for recirculated air within the vehicle 14 when the air quality sensor 82 senses pollutants above the predetermined pollutant level. Additionally or alternatively, the inlet door 50 may be positioned in the first position when the external temperature sensed by the first temperature sensor 38 is above a predetermined temperature. It is contemplated that the predetermined measurements, such as, for example, temperature and/or time can be any practicable predetermined measurement.

Figure 7:
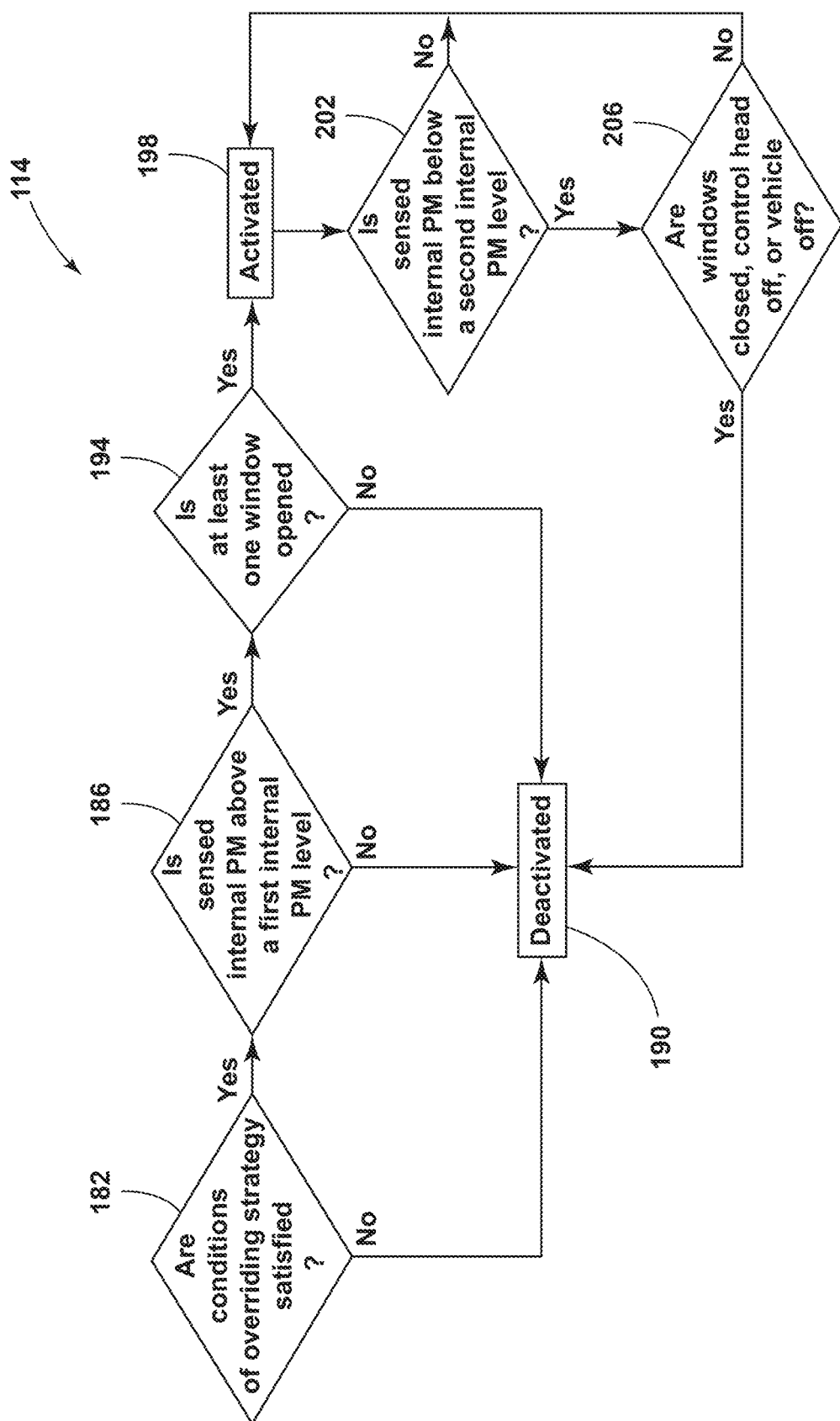
FIG. 7 is a flow diagram of an overriding strategy of a vehicle air control system, according to one example.

Referring to FIGS. 1, 4, and 7, the controller 54 may include one or more routine 134 relating to the overriding strategy 114. In the illustrated non-limiting example of FIG. 4, the routine 134 may proceed from the first recirculation strategy 110 to the overriding strategy 114. However, the sequential order is merely exemplary, and not meant to be limiting. In decision step 182 the controller 54 determines whether the conditions for overriding strategy 114 are satisfied. If the conditions are not satisfied, the routine 134 may bypass the overriding strategy 114 and proceed to the second recirculation strategy 118.

If the controller 54 determines that the conditions of overriding strategy 114 are satisfied, the controller 54 may rotate the inlet door 50 to the second position to allow the outside air to flow into the vehicle 14. The controller 54 may include one or more routines 134 for determining if the conditions of overriding strategy 114 are satisfied based on multiple vehicle conditions. In decision step 186, the controller 54 can determine whether the sensed internal PM is greater than a first internal PM level. If the sensed internal PM is less than the first internal PM level, then in step 190 the conditions of the overriding strategy 114 are not satisfied and the overriding strategy 114 remains deactivated. The first internal PM level may be in a range of from about 400 parts/µm to about 500 parts/µm. In a non-limiting example, the predetermined PM threshold may be about 450 parts/µm. If the sensed internal PM is greater than the first internal PM threshold, the routine 134 can proceed to decision step 194.

In decision step 194, the controller 54 can determine if at least one of the plurality of windows 94 is at least partially opened. The plurality of window sensors 102 may send a signal to the controller 54 indicative of the position of each of the plurality of windows 94. If all of the plurality of windows 94 are closed, then the routine 134 proceeds to step 190 where the overriding strategy 114 remains deactivated. If the controller 54 determines that at least one of the plurality of windows 94 is at least partially opened, then the overriding strategy 114 is activated in step 198. In a non-limiting example, the overriding strategy 114 may remain deactivated unit each of the plurality of windows 94 is partially opened. When activated, the inlet door 50 is rotated to the second position to allow outside air into the vehicle 14. The inlet door 50 may remain in the second position until the overriding strategy 114 is deactivated.

In decision step 202, the controller 54 can determine if the sensed internal PM is below a second internal PM level. In various examples, the second internal PM threshold may be in a range of from about 350 parts/µm to about 450 parts/µm. It is contemplated that the first and second internal PM levels may be substantially similar, or alternatively, different PM levels. If the sensed internal PM, as sensed by the PM sensor 26, is above the second internal PM level, the routine 134 can return to step 198, and the overriding strategy 114 remains activated within the inlet door 50 in the second position. If the sensed internal PM is less than the second internal PM threshold, the routine 134 can proceed to decision step 206.

In decision step 206, the controller 54 can determine if carious predefined conditions are satisfied to deactivate the overriding strategy 114. The predefined conditions may include, for example, if each of the plurality of windows 94 is in the closed position, if a vehicle control head is deactivated, and/or if the vehicle 14 is off. If at least one of the predefined conditions in decision step 206 is satisfied, the routine 134 can return to step 190 and the overriding strategy 114 is deactivated. Alternatively, if none of the conditions in decision step 206 are satisfied, the routine 134 returns to step 198 and the overriding strategy 114 remains activated. The overriding strategy 114 may be advantageous for a situation in which one or more occupants of the vehicle 14 are smoking. The overriding strategy 114 may allow for ventilation of the interior 22 of the vehicle 14. In this way, the overriding strategy 114 can supersede the first and second recirculation strategies 110, 118 when at least one occupant of the vehicle 14 is smoking. Once the overriding strategy 114 is deactivated, the inlet door 50 may return to the first position. The routine 134 may proceed to the second recirculation strategy 118, or may return to the first recirculation strategy 110.

Referring still to FIG. 4, the second recirculation strategy 118 may be based on the sensed external PM levels, as sensed by the PM sensor 26. Stated differently, the position of the inlet door 50 may, at least partially, be based on the sensed PM levels in the outside air compared to an external PM threshold or level. In decision step 210 of the second recirculation strategy 118, the controller 54 can determine if the sensed external PM is greater than a first external PM threshold. The first external PM threshold may be in a range of from about 25 parts/μm to about 45 parts/μm. In a non-limiting example, the first external PM threshold may be about 35 parts/μm. If the controller 54 determines that the sensed external PM is greater than the first external PM threshold, the routine 134 may proceed to step 214.

In step 214 where the inlet door 50 may be positioned based on the sensed vehicle speed and the sensed external temperature that are communicated to the controller 54 by the vehicle speed sensor 42 and the first temperature sensor 38. In this way, the inlet door 50 can be positioned as a function of the sensed vehicle speed and the sensed external temperature. In the non-limiting example illustrated in FIG. 7, when the sensed external temperature is a first predetermined temperature and the sensed vehicle speed is a first predetermined speed, the inlet door 50 may be in the third position (e.g., partially opened position). In various examples, the first predetermined temperature may be in a range of from about 8° C. to about 10° C. The first predetermined speed may be in a range of from about 90 km/hr to about 100 km/hr. When the sensed external temperature is the first predetermined temperature and the sensed vehicle speed is a second predetermined speed, the inlet door 50 may be in the first position (e.g., the recirculation position). The second predetermined speed may be equal to or greater than about 100 km/hr. According to various aspects, the greater second predetermined speed may result in an increase force acting on the inlet door 50, thereby interfering, or preventing, the inlet door 50 from being in the third position. Moreover, in the illustrated non-limiting example, when the sensed external temperature is a second predetermined temperature, the inlet door 50 may be in the first position when the sensed vehicle speed is the first predetermined speed and when the sensed vehicle speed is the second predetermined speed. It is contemplated that the predetermined speed and predetermined temperatures are merely exemplary and may be any practicable measurement.

Referring to FIGS. 4 and 7, when the sensed external PM is above the first external PM threshold, as determined in decision step 210, the outside air may be labeled as dirty by the controller 54. As such, the position of the inlet door 50 may be in the first position more frequently to reduce the amount of PM flowing into the vehicle 14. However, when the sensed external temperature is at or below a first predetermined temperature and the sensed vehicle speed is at or below a first predetermined speed, the inlet door 50 may be partially opened to the third position to allow some outside air to flow into the vehicle 14.

Returning to decision step 210, if the sensed external PM is below the first external PM threshold, the routine 134 may proceed to decision step 218. Additionally or alternatively, the routine 134 may proceed from step 214 to decision step 218 after a predetermined amount of time, or alternatively, based on the sensed external PM level when the inlet door 50 is in the third position. In decision step 218, the controller 54 can determine if the sensed external PM is below a second external PM threshold. In various examples, the second external PM threshold may be in a range of from about 10 parts/μm to about 20 parts/μm. In a non-limiting example, the second external PM threshold may be about 15 parts/μm. When the sensed external PM is below the second external PM threshold, the outside air may be labeled as clean by the controller 54. If the sensed external PM is above the second external PM threshold, the routine 134 may return to the first recirculation strategy 110. If the controller 54 determines in decision step 218 that the sensed external PM is below the second external PM threshold, the routine 134 may proceed to decision step 222.

In decision step 222, the controller 54 can determine whether other vehicle strategies are requesting a specific position of the inlet door 50. The other vehicle strategies may be, for example, a heated windshield, a heated back light, activation of the compressor (e.g., air conditioning), or another mode or function of the vehicle 14. If the controller 54 determines that another vehicle strategy is requesting a specific position of the inlet door 50, the routine 134 may return to the activation strategy 122 or first recirculation strategy 110. If the controller 54 determines that there are no other vehicle strategies requesting a specific position of the inlet door 50, the routine 134 may proceed to step 226.

In step 226, the inlet door 50 may be positioned based on the sensed vehicle speed and the previous position of the inlet door 50 from step 214 (e.g., when the outside air is labeled as dirty). In this way, the position of the inlet door 50 can be a function of the vehicle speed and the position when the outside air is labeled as dirty. As illustrated in the non-limiting example in FIG. 8, when the inlet door 50 was previously in the first position (e.g., the recirculating position) and the sensed vehicle speed is a first predetermined speed, the inlet door 50 may be rotated to the third position (e.g., the partially opened position). The first predetermined speed may be in a range of from about 90 km/hr to about 100 km/hr. When the inlet door 50 was previously in the first position and the sensed vehicle speed is a second predetermined speed, the inlet door 50 may be moved to the second position (e.g., the outside air position). The second predetermined speed may be equal to or greater than about 100 km/hr. When the inlet door 50 was previously in the third position, the inlet door 50 may be rotated to the second position when the sensed vehicle speed is the first predetermined speed and when the sensed vehicle speed is the second predetermined speed. The non-limiting examples of FIGS. 7 and 8 are merely exemplary, and therefore, are not considered limiting. In step 226, the inlet door 50 may be rotated to the second position or the third position based on the previous position of the inlet door 50 and the sensed vehicle speed. Both the second and third positions allow at least some outside air to flow into the vehicle 14.

In decision step 230, the controller 54 can sample the outside air via the sensed information from PM sensor 26. In decision step 230, the controller 54 may determine whether the outside air is labeled as clean based on the sensed external PM level and/or a rate of change of the sensed external PM level. If the outside air is labeled as clear, the routine 134 may proceed to step 234, where the inlet door 50 is rotated to the second position. In a non-limiting example, the outside air is labeled as clean if of the sensed external PM level remains below a third PM threshold for the predetermined amount of time. The third external PM threshold may be in a range of from about 20 parts/μm to about 30 parts/μm. Moreover, the predetermined amount of time may be in a range of from about 20 seconds to about 40 seconds. In another non-limiting example, if the sensed external PM decreases at a predefined rate (e.g., parts/μm/sec), the outside air can be labeled as clean. The clean outside air may result in the inlet door 50 being rotated to the second position to allow outside air to flow through the HVAC system 46 and into the vehicle 14.

In step 230, if the outside air is labeled as dirty based on the sampling, the routine 134 may proceed to step 238. In a non-limiting example, if the sensed external PM level is greater than third external PM threshold after the predetermined amount of time, the controller 54 may rotate the inlet door 50 to a selected position based on the sensed vehicle speed and the sense external temperature. In a specific non-limiting example, if the sensed PM level increases to about 25 μm in about 30 seconds, the controller 54 can rotate the inlet door 50 to the position as determined by step 238. In another non-limiting example, the controller 54 may determine and/or calculate the rate of change of the sensed external PM level. If the rate of change increases by a predefined rate (e.g., parts/μm/sec), the controller 54 can proceed to step 238.

If the outside air is labeled as dirty in step 234, the routine 134 can proceed to step 238 where the inlet door 50 may be rotated to the first or third position. The inlet door 50 may be positioned as a function of the sensed external temperature and the sensed vehicle speed, similar to the position in step 214 and as illustrated in a non-limiting example in FIG. 7. The routine 134 may proceed from step 238 to decision step 242, where the controller 54 can determine if various predefined conditions are satisfied, such as, for example, if other vehicle strategies are requesting a specific position of the inlet door 50 and/or if the conditions are satisfied to activate the overriding strategy 114. If neither of the defined conditions in step 242 are satisfied, the routine 134 may return to decision step 230, allowing the controller 54 to continue to sample the outside air. If either one of the defined conditions in decision step 242 are satisfied, the routine 134 may proceed to step 234 where the inlet door 50 is rotated to the second position. From step 234, the routine 134 may return to the first recirculation strategy 110. It is contemplated that the first and second recirculation strategies 110, 118 and in the overriding strategy 114 may occur in any order. Additionally, it is contemplated that any of the deactivating conditions, as set forth in the activation strategy 122 that would prevent activation of the first recirculation strategy 110, may stop and/or pause any one of the first recirculation strategy 110, the overriding strategy 114, and/or the second recirculation strategy 118 at any time.

Figure 10:
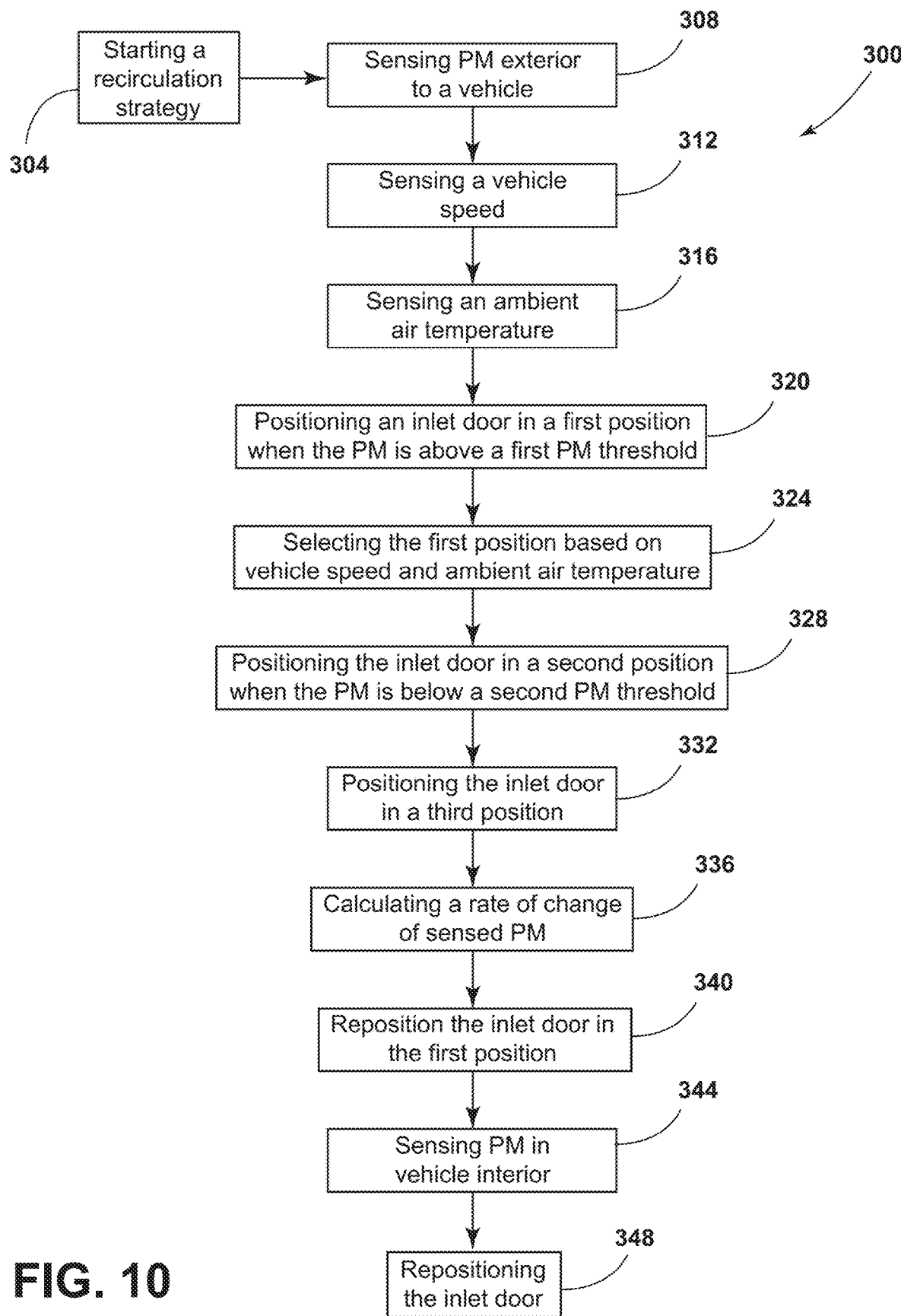
FIG. 10 is a flow diagram of a method of controlling air quality within a vehicle, according to one example.

Referring to FIG. 10, and referring still to FIGS. 1-9, a method 300 of controlling air quality within the vehicle 14 includes step 304 of starting the second recirculation strategy 118. Step 304 may include the routine 134 proceeding through the activation strategy 122, the first recirculation strategy 110, and/or the overriding strategy 114. Once the controller 54 determines that the conditions from the previous vehicle strategies are satisfied, the controller 54 may start the second recirculation strategy 118. In step 308, the external PM exterior to the vehicle 14 is sensed by the PM sensor 26. In step 312, the speed of the vehicle 14 is sensed by the vehicle speed sensor 42. In step 316, the ambient air temperature is sensed by the first temperature sensor 38. The sensed information from steps 308, 312, 316 are communicated to the controller 54.

In step 320, the controller 54 may send a signal to the rotation assembly 78 to position the inlet door 50 based on the sensed external PM being above the first external PM threshold. The first external PM threshold may be in a range of from about 25 parts/μm to about 45 parts/μm. In step 324, the position of the inlet door 50 is selected based on the sensed vehicle speed and the sensed ambient air temperature. The position may be determined, as explained previously, relating to step 214 of FIG. 4 and exemplified in a non-limiting example of FIG. 8. In this way, the inlet door 50 may be positioned as a function of the sensed vehicle speed and the sensed ambient air temperature. Generally, in step 324, the inlet door 50 may be positioned in one of the first position (e.g., the recirculation position) or the third position (e.g., the partially opened position). In step 328, the controller 54 may rotate the inlet door 50 to a different position when the sensed external PM is below the second external PM threshold. In various examples, the second external PM threshold may be in a range of from about 10 parts/μm to about 20 parts/μm. Generally, the inlet door 50 is positioned in one of the second position (e.g., the outside air position) or the third position (e.g., the partially opened position) in step 328.

In step 332, the controller 54 may rotate the inlet door 50 to the third position. When the inlet door 50 is in the third position, the external PM can be sensed by the PM sensor 26 to sample the outside air. In step 336, the controller 54 may calculate the rate of change of the external PM level based on the sensed information communicated to the controller 54 by the PM sensor 26. In step 340, the controller 54 may rotate the inlet door 50 to the position of step 320. In this way, the inlet door 50 may be rotated to the first position or the third position. In step 344, the internal PM level is sensed by the PM sensor 26. If the internal PM level exceeds the internal PM threshold, the inlet door 50 may be repositioned to the second position. In step 348, the position of the inlet door 50 may then allow outside air to flow into the interior 22 of the vehicle 14. In various examples, the internal PM threshold may be in a range of from about 400 parts/μm to about 500 parts/μm. It is contemplated that the steps of the method 300 may be accomplished in any practicable order and may include additional or fewer steps than illustrated in FIG. 10, such that FIG. 10 is merely exemplary and not meant to be limiting.

Use of the present device may provide for a variety of advantages. For example, the activation strategy 122 may automatically engage at least one of the first and second recirculation strategies 110, 118 when the conditions are satisfied. Additionally, the first recirculation strategy 110 may provide for an air control strategy based on pollutants sensed by the air quality sensor 82. Further, the second recirculation strategy 118 may provide an air control strategy based on sensed external PM levels. Moreover, the overriding strategy 114 may provide ventilation of the vehicle 14 for a smoker situation, where one or more occupants of the vehicle 14 are smoking. In this way, the air control system 10 may provide an automatic strategy for ventilating the air within the vehicle 14, if one or more of the occupants of the vehicle 14 are smoking. Also, the air control system 10 may provide for automatic regulation of the air within the vehicle 14 to provide cleaner air to the occupants within the vehicle 14 based on a variety of sensed information. Additional benefits or advantages of using this device may also be realized and/or achieved.

According to various examples, a vehicle air control system includes a vehicle body that defines an interior. A particulate matter sensor is coupled to the vehicle body. A temperature sensor is coupled to the exterior of the vehicle body. A vehicle speed sensor is coupled to the vehicle body. A heat, ventilation, and air condition (HVAC) system is disposed within the interior of the vehicle body. The HVAC system includes an inlet door rotatable between a first position, a second position, and a third position therebetween. A controller is configured to receive a signal from at least one of the particulate matter sensor, the temperature sensor, and the vehicle speed sensor. The controller is configured to rotate the inlet door in response to the signal. Embodiments of the present disclosure may include one or a combination of the following features:
  a controller is configured to rotate an inlet door to a first position when a particulate matter sensor senses a particulate matter level above a predetermined particulate matter threshold;
  a vehicle speed sensor sends a signal to the controller corresponding to a sensed vehicle speed, and the controller is configured to rotate the inlet door to the first position when the sensed vehicle speed is above a predetermined speed;
  a vehicle speed sensor sends a signal to a controller corresponding to a sensed vehicle speed, and the controller is configured to rotate an inlet door to a third position when the sensed vehicle speed is at or below a predetermined speed;
  a controller is configured to rotate an inlet door from the first position to the third position for a predetermined amount of time when the particulate matter sensor senses particulate matter below a predetermined particulate matter threshold;
  a controller is configured to calculate a rate of change of particulate matter sensed by a particulate matter sensor;
  a plurality of vehicle windows is coupled to a vehicle body and a window sensor assembly includes a plurality of window sensors, and one of the plurality of window sensors is disposed proximate each of the plurality of vehicle windows; and
  a controller is configured to rotate an inlet door to the second position when a window sensor assembly senses at least one of a plurality of vehicle windows is in an opened position and a particulate matter sensor senses particulate matter within an interior above a predetermined particulate matter threshold.

According to various examples, an air control system for a vehicle includes a vehicle body that defines an interior. At least one vehicle window is coupled to the vehicle body. A heat, ventilation, and air conditioning (HVAC) system is disposed within the interior. The HVAC system includes an inlet door that is operable between a first position, a second position, and a third position therebetween. A particulate matter sensor is disposed in the interior of the vehicle body. A window sensor assembly is coupled to the vehicle body and is configured to sense a position of the at least one vehicle window. A controller is configured to control the inlet door in response to a signal from at least one of the particulate matter sensor and the window sensor assembly. Embodiments of the present disclosure may include one or a combination of the following features:
  a window sensor assembly includes a plurality of window sensors and the at least one vehicle window includes a plurality of vehicle windows, and one of the plurality of window sensors is disposed proximate each of the plurality of vehicle windows;
  a controller is configured to move an inlet door to the first position when a particulate matter sensor senses particulate matter external to a vehicle body above a predetermined particulate matter threshold;
  a predetermined particulate matter threshold is in a range of from about 30 parts/µm and about 40 parts/µm;
  a controller is configured to move an inlet door to a second position when a particulate matter sensor senses particulate matter within an interior of a vehicle body above a predetermined particulate matter threshold and a window sensor assembly senses at least one vehicle window is in an opened position;
  a predetermined particulate matter threshold is in a range of from about 400 parts/µm and about 500 parts/µm;
  at least one vehicle window includes a plurality of vehicle windows, and a controller is configured to move an inlet door to a second position when a window sensor assembly senses each of the plurality of vehicle windows is in an opened position; and
  a controller is configured to calculate a rate of change of particulate matter sensed by the particulate matter sensor.

According to various examples, a method of controlling air quality of a vehicle interior includes starting a recirculation strategy in a vehicle. Particulate matter is sensed exterior to the vehicle and a vehicle speed is sensed. An ambient air temperature sensed exterior to the vehicle. An air inlet door of an HVAC system is positioned in a first position when the sensed particulate matter is above a first predetermined particulate matter threshold. The first position is selected based on the sensed vehicle speed and the sensed ambient air temperature. The air inlet door is positioned in a second position when the sensed particulate matter is below a second predetermined particulate matter threshold. Embodiments of the present disclosure may include one or a combination of the following features:
  particulate matter is sensed within an interior of a vehicle and a recirculation strategy is overridden in response to a sensed particulate matter within the interior;
  an inlet door is positioned in a third position for a predetermined amount of time, and the inlet door is repositioned in a first position when particulate matter exterior to a vehicle is above a third predetermined particulate matter threshold; and
  a rate of change of sensed particulate matter is calculated.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle air control system, comprising:
a vehicle body defining an interior;
a particulate matter sensor coupled to the vehicle body;
a temperature sensor coupled to an exterior of the vehicle body;
a vehicle speed sensor coupled to the vehicle body;
a heat, ventilation, and air conditioning (HVAC) system at least partially disposed within the interior of the vehicle body, wherein the HVAC system includes an inlet door rotatable between a first position, a second position, and a third position therebetween; and
a controller configured to receive a signal from at least one of the particulate matter sensor, the temperature sensor, and the vehicle speed sensor, wherein the controller is configured to rotate the inlet door in response to the signal, wherein the controller is configured to rotate the inlet door from the first position to the third position for a predetermined amount of time when the particulate matter sensor senses particulate matter below a first predetermined particulate matter threshold.

2. The vehicle air control system of claim 1, wherein the controller is configured to rotate the inlet door to the first position when the particulate matter sensor senses a particulate matter level above a second predetermined particulate matter threshold.

3. The vehicle air control system of claim 1, wherein the signal from the vehicle speed sensor corresponds to a sensed vehicle speed, and wherein the controller is configured to rotate the inlet door to the first position when the sensed vehicle speed is above a predetermined speed.

4. The vehicle air control system of claim 1, wherein the signal from the vehicle speed sensor corresponds to a sensed vehicle speed, and wherein the controller is configured to rotate the inlet door to the third position when the sensed vehicle speed is at or below a predetermined speed.

5. The vehicle air control system of claim 1, wherein the controller is configured to calculate a rate of change of the particulate matter sensed by the particulate matter sensor.

6. The vehicle air control system of claim 1, further comprising:
a plurality of vehicle windows coupled to the vehicle body; and
a window sensor assembly including a plurality of window sensors, wherein one of the plurality of window sensors is disposed proximate each of the plurality of vehicle windows.

7. The vehicle air control system of claim 6, wherein the controller is configured to rotate the inlet door to the second position when the window sensor assembly senses at least one of the plurality of vehicle windows is in an opened position and the particulate matter sensor senses particulate matter within the interior above the first predetermined particulate matter threshold.

8. An air control system for a vehicle, comprising:
a vehicle body defining an interior;
at least one vehicle window coupled to the vehicle body;
a heat, ventilation, and air conditioning (HVAC) system disposed within the interior, wherein the HVAC system includes an inlet door operable between a first position, a second position, and a third position therebetween;
a particulate matter sensor disposed in the interior of the vehicle body;
a window sensor assembly coupled to the vehicle body and configured to sense a position of the at least one vehicle window; and
a controller configured to control the inlet door in response to a signal from at least one of the particulate matter sensor and the window sensor assembly, wherein the controller is configured to move the inlet door to the second position when the particulate matter sensor senses particulate matter within the interior of the vehicle body above a predetermined particulate matter threshold and the window sensor assembly senses the at least one vehicle window is in an opened position.

9. The air control system of claim 8, wherein the window sensor assembly includes a plurality of window sensors and the at least one vehicle window includes a plurality of vehicle windows, and wherein one of the plurality of window sensors is disposed proximate each of the plurality of vehicle windows.

10. The air control system of claim 8, wherein the second position of the inlet door is an opened position to allow outside air from an area external to the vehicle body to flow through the HVAC system into the interior, wherein the particulate matter sensor is configured to sense particulate matter external to the vehicle in the outside air flowing into the interior.

11. The air control system of claim 10, wherein the predetermined particulate matter threshold is in a range of from 30 parts/μm to 40 parts/μm.

12. The air control system of claim 8, wherein the predetermined particulate matter threshold is in a range of from 400 parts/μm to 500 parts/μm.

13. The air control system of claim 8, wherein the at least one vehicle window includes a plurality of vehicle windows, and wherein the controller is configured to move the inlet door to the second position when the window sensor assembly senses each of the plurality of vehicle windows is in an opened position.

14. The air control system of claim 8, wherein the controller is configured to calculate a rate of change of particulate matter sensed by the particulate matter sensor.

15. A method of controlling air quality of a vehicle interior, comprising;
starting a recirculation strategy in a vehicle having a heat, ventilation, and air conditioning (HVAC) system with an inlet door operable between a first position, a second position, and a third position;
sensing particulate matter above a first predetermined particulate matter threshold;
positioning the inlet door of the HVAC system in the first position when the sensed particulate matter is above the first predetermined particulate matter threshold;
sensing a vehicle speed;
sensing an ambient air temperature exterior to the vehicle;
selecting the first position to be one of a closed position and a partially opened position based on the sensed vehicle speed and the sensed ambient air temperature, wherein the inlet door is rotated to the partially opened position when the vehicle speed is at or below a predetermined speed and to the closed position when the vehicle speed is above the predetermined speed;
sensing particulate matter below a second predetermined particulate matter threshold, the second predetermined particulate matter threshold being less than the first predetermined particulate matter threshold; and
positioning the inlet door in the second position when the sensed particulate matter is below the second predetermined particulate matter threshold.

16. The method of claim 15,
wherein the sensing particulate matter is performed within an interior of the vehicle, and wherein the method further comprises:
overriding the recirculation strategy in response to sensed particulate matter within the interior.

17. The method of claim 15, further comprising:
positioning the inlet door in the third position for a predetermined amount of time; and repositioning the inlet door in the first position when particulate matter exterior to the vehicle is above a third predetermined particulate matter threshold.

18. The method of claim 15, further comprising:
calculating a rate of change of the sensed particulate matter.

19. The method of claim 15, wherein the second position is one of the partially opened position and a fully opened position.

\* \* \* \* \*